United States Patent [19]

Kanno

[11] Patent Number: 5,561,487
[45] Date of Patent: Oct. 1, 1996

[54] LENS BARREL

[75] Inventor: Hideo Kanno, Chiba, Japan

[73] Assignee: Nikon Corporation, Tokyo, Japan

[21] Appl. No.: 534,818

[22] Filed: Sep. 27, 1995

[30] Foreign Application Priority Data

Nov. 10, 1994 [JP] Japan .................................. 6-276484

[51] Int. Cl.$^6$ .............................. G03B 17/12; G02B 7/02; G02B 7/14
[52] U.S. Cl. ........................... 396/529; 359/819; 359/827
[58] Field of Search .............................. 354/286, 195.12; 359/703, 704, 694, 819, 821, 827

[56] References Cited

U.S. PATENT DOCUMENTS

| | | | |
|---|---|---|---|
| 4,323,303 | 4/1982 | Enomoto | 354/25 |
| 4,738,512 | 4/1988 | Faatz et al. | 350/245 |
| 5,339,193 | 8/1994 | Korpert et al. | 359/819 |

Primary Examiner—Michael L. Gellner
Assistant Examiner—John Chizmar

[57] ABSTRACT

A lens barrel comprises a barrel body, inside and outside fitting members disposed within the barrel body at a predetermined interval in a direction along an axis thereof and each formed with a female screw, an inside lens holding frame having a male screw screwed into the female screw of the inside fitting member and an outside lens holding frame having a male screw screwed into the female screw of the outside fitting member. An external diameter of the male screw of the inside lens holding frame is larger than an internal diameter of the female screw of the outside fitting member. The male screw of the inside lens holding frame is segmented into a plurality of portions by a plurality of notches having an internal diameter smaller than the internal diameter of the female screw. The lens barrel also comprises a plurality of recesses formed in the outside fitting member and admitting passages of the plurality of segmented male screw portions of the inside lens holding frame.

3 Claims, 2 Drawing Sheets

LENS BARREL

BACKGROUND OF THE INVENTION

1. Field of the Invention

The present invention relates generally to a lens barrel of a camera, etc. and, more particularly, to a lens barrel with an improved structure for fitting a lens unit.

2. Related Background Art

Generally, a lens barrel of a camera, etc. is constructed of a plurality of lens elements disposed at an interval in a direction along an axial line of the lens barrel.

Then, in the thus constructed lens barrel, with respect to an external diameter of a male screw of a lens holding frame for fixing the lenses incorporated from one direction, the external diameter of the lens holding frame positioned inside and therefore incorporated at first is minimized, but the external diameter becomes larger with a more approach to the outside.

With this construction taken, the lens holding frame for fixing the lenses can be incorporated sequentially from the inside to the outside.

In recent years, however, as in a large-diameter lens, an effective diameter of the lens has tended to increase to improve an optical performance. According to a lens mounting structure in which the external diameter of the lens holding frame positioned inside is minimized, but the external diameter increases sequentially with a more approach to the outside as in the prior art, a problem is that the lens barrel increases in size.

SUMMARY OF THE INVENTION

It is a primary object of the present invention, which was devised to obviate the above problems inherent in the prior art, to provide a lens barrel capable of surely incorporating a lens holding frame even when an external diameter of a male screw of an inside lens holding frame incorporated anteriorly is equal to or larger than an external diameter of a male screw of an outside lens holding frame incorporated posteriorly.

A lens barrel in one embodiment comprises a barrel body, inside and outside fitting members disposed within the barrel body at a predetermined interval in a direction along an axial line of the barrel body and each formed with a female screw, an inside lens holding frame having a male screw screwed into the female screw of the inside fitting member and an outside lens holding frame having a male screw screwed into the female screw of the outside fitting member. An external diameter of the male screw of the inside lens holding frame is larger than an internal diameter of the female screw of the outside fitting member. The male screw of the inside lens holding frame is segmented into a plurality of portions by a plurality of notches having an internal diameter smaller than the internal diameter of the female screw. The lens barrel further comprises a plurality of recesses formed in the outside fitting member and admitting passages of the plurality of segmented male screw portions of the inside lens holding frame.

In the lens barrel in accordance with another embodiment, the outside fitting member is disposed in a position closer to a camera body than the inside fitting member.

In the lens barrel in accordance with still another embodiment, the female screw of the inside fitting member and the male screw of the inside lens holding frame are bonded together with a bonding agent supplied from a bonding tool inserted along the recess.

In the lens barrel according to the present invention, the external diameter of the male screw of the inside lens holding frame incorporated anteriorly is set larger than the internal diameter of the female screw of the outside fitting member into which the male screw of the outside lens holding frame incorporated posteriorly is screwed.

Then, the male screw of the inside lens holding frame is segmented into the plurality of portions by the plurality of notches having the external diameter smaller than the internal diameter of the female screw of the outside fitting member. The male screw passes along the recess of the outside fitting member, the notch admits a passage of the female screw of the outside fitting member, whereby the inside lens holding frame is moved to a position of the inside fitting member, and the male screw is screwed into the female screw of the inside fitting member. Thereafter, the male screw of the outside lens holding frame is screwed into the female screw of the outside fitting member.

Further, the outside fitting member is disposed in the position more proximal to the camera body than the inside fitting member.

Moreover, the bonding tool is inserted along the recess of the outside fitting member, and, with the bonding agent supplied from this bonding tool, the female screw of the inside fitting member and the male screw of the inside lens holding frame are bonded together.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be described with reference to the drawings.

Figure 1:
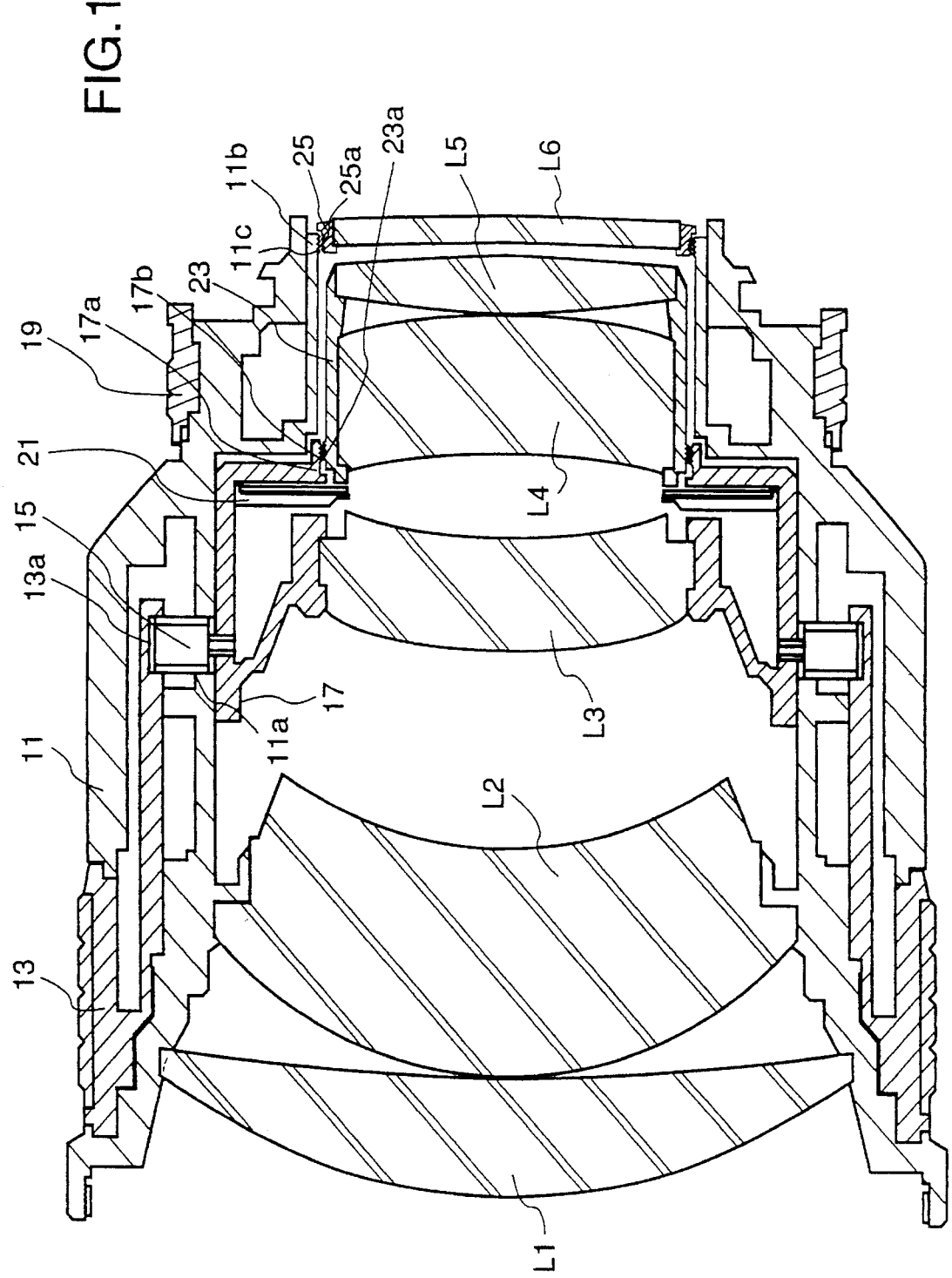
FIG. 1 is a sectional view illustrating one embodiment of a lens barrel of the present invention.

FIG. 1 illustrates one embodiment of a lens barrel according to the present invention. Referring to FIG. 1, a fixed barrel designated at 11 constitutes a barrel body.

Six pieces of lenses L1, L2, L3, L4, L5, L6 are arranged in sequence from the front edge thereof at an interval in a direction along an axial line of the fixed barrel 11.

Herein, the lenses L1, L2, L6 are defined as fixed lenses, while the lenses L3, L4, L5 are defined as focusing lenses.

A focus ring 13 is fitted to the front edge of the fixed barrel 11, and one edge of a focus pin 15 is fitted to a focus cam 13a formed at the rear edge of the focus ring 13. The other edge of the focus pin 15 is fixed to a focus movable frame 17 through a guide groove 11a formed in the fixed barrel 11.

The lens L3 is fixed to the focus movable frame 17.

Then, when rotating the focus ring 13, the focus movable frame 17 is moved along an optical axis with the aid of the focus cam 13a and the guide groove 11a as well.

An aperture ring 19 is fitted to the rear edge of the fixed barrel 11. An aperture mechanism 21 operated with rotations of this aperture ring 19 is provided in the focus movable frame 17.

An inside fitting member 17a is formed at the rear edge of the focus movable frame 17, and a female screw 17b is formed in an inner periphery of this inside fitting member 17a.

A male screw 23a of an inside lens holding frame 23 is screwed into this female screw 17b, and the lenses L4, L5 are fixed to the inside lens holding frame 23.

An outside fitting member 11b is formed at the rear edge of the fixed barrel 11, i.e., on the side of an unillustrated camera body, and a female screw 11c is formed in an inner periphery of this outside fitting member 11b.

A male screw 25a of an outside lens holding frame 25 is screwed into this female screw 11c, and the lens L6 is fixed to the outside lens holding frame 25.

Figure 2:
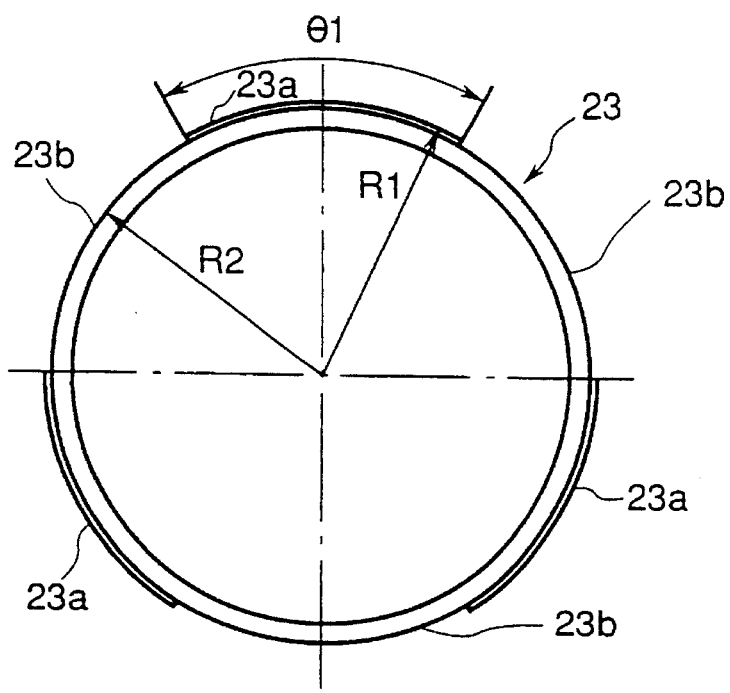
FIG. 2 is a front view illustrating details of an inside lens holding frame of FIG. 1.
Figure 3:
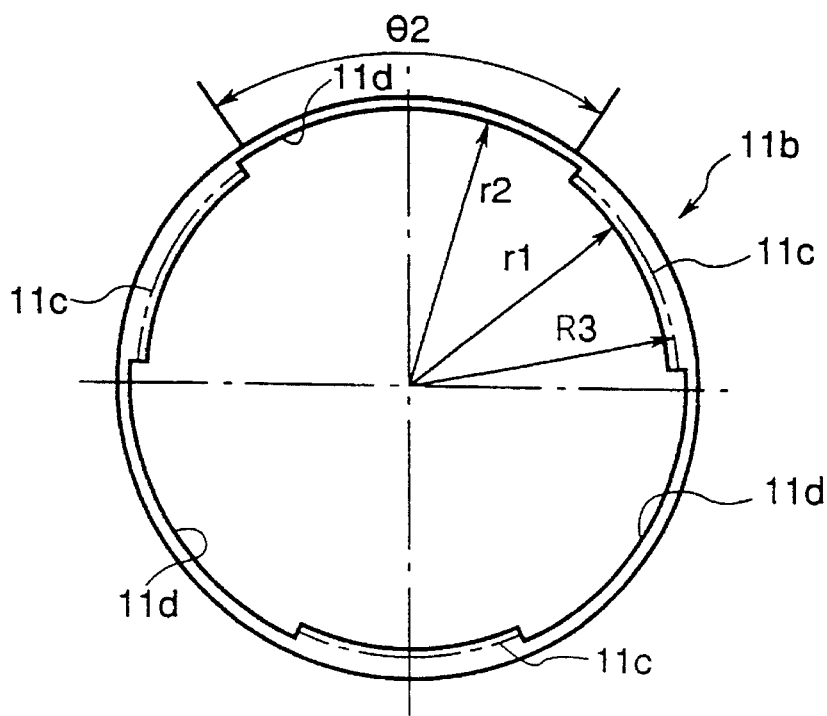
FIG. 3 is a front view illustrating details of an outside fitting member of FIG. 1.

FIG. 2 illustrates details of the above-mentioned inside lens holding frame 23, while FIG. 3 illustrates details of the above-described outside fitting member 11b.

In accordance with this embodiment, an external diameter R1 of the male screw 23a of the inside lens holding frame 23 is set larger than an internal diameter r1 of the female screw 11c of the outside fitting member 11b.

Then, the male screw 23a of the inside lens holding frame 23 is segmented by three notches 23b into three portions.

An external diameter R2 of this notch 23b is set smaller than the internal diameter r1 of the female screw 11c of the outside fitting member 11b.

Three recesses 11d admitting passages of the three segmented male screws 23a of the inside lens holding frame 23 are formed in the outside fitting member 11b.

An internal diameter r2 of this recess 11d is set larger than the external diameter R1 of the male screw 23a.

Further, an angle-of-formation θ2 of this recess 11d is set larger than an angle-of-formation θ1 of the male screw 23a.

Note that the above male screws 23a, 25a and female screws 17b, 11c are fine screws having a small pitch in this embodiment.

In the lens barrel explained above, at first, the male screw 23a passes along the recess 11d of the outside fitting member 11b, the notch 23b admits a passage of the female screw 11c of the outside fitting member 11b, whereby the inside lens holding frame 23 is moved to a position of the inside fitting member 17a, and the male screw 23a is screwed into the female screw 17b of the inside fitting member 17a.

Thereafter, a bonding tool such as, e.g., a hypodermic needle is inserted along the recess 11d of the outside fitting member 11b. With a bonding agent supplied from this bonding tool, the female screw 17b of the inside fitting member 17a is bonded to the male screw 23a of the inside lens holding frame 23.

Then, finally, the male screw 25a of the outside lens holding frame 25 is screwed into the female screw 11c of the outside fitting member 11b.

In the thus constructed lens barrel, the male screw 23a of the inside lens holding frame 23 is segmented into three portions by three notches 23b each having an external diameter R2 smaller than the internal diameter r1 of the female screw 11c of the outside fitting member 11b. The female screw 11c of the outside fitting member 11b is formed with a recess 11d admitting a passage of the male screw 23a of the inside lens holding frame 23. Hence, even when the external diameter R1 of the male screw 23a of the inside lens holding frame 23 incorporated anteriorly is equal to or larger than an external diameter R3 of the male screw 25a of the outside lens holding frame 25 incorporated posteriorly, the inside lens holding frame 23 can be surely incorporated.

As a result, unlike the prior art, there is no necessity for minimizing the external diameter of the lens holding frame positioned inside but sequentially increasing it with a more approach to the outside, and downsizing of the lens barrel can be attained.

Further, in the above-described lens barrel, the outside fitting member 11b is disposed in the position closer to the camera body than the inside fitting member 17a, and, therefore, it is possible to restrain the external diameter of the lens barrel on the side of the camera body and also improve a fitting property of the lens barrel to the camera body.

Moreover, in the above-described lens barrel, the bonding tool is inserted along the recess 11d of the outside fitting member 11b, thereby making it possible to easily bond the female screw 17b of the inside fitting member 17a to the male screw 23a of the inside lens holding frame 23.

Note that the embodiment discussed above has dealt with the example where the notches 23b and the recesses 11d are formed by threes, but the present invention is not limited to such an embodiment. It may suffice that a plurality, i.e., two or larger number of those components are provided.

As discussed above, in the lens barrel of the present invention, the male screw of the inside lens holding frame is segmented into the plurality of portions by the plurality of notches each having the external diameter smaller than the internal diameter of the female screw of the outside fitting member, and the female screw of the outside fitting member is formed with the recess admitting the passage of the male screw of the inside lens holding frame. Therefore, even when the external diameter of the male screw of the inside lens holding frame incorporated anteriorly is equal to or larger than the external diameter of the male screw of the outside lens holding frame incorporated posteriorly, the inside lens holding frame can be surely incorporated.

As a result, there is eliminated the necessity for increasing the internal diameter of the female screw of the outside fitting member, whereby the downsizing of the lens barrel can be attained.

Further, the outside fitting member is disposed in the position more proximal to the camera body than the inside fitting member, and hence the external diameter of the lens barrel on the side of the camera body can be restrained, with the result that the fitting property of the lens barrel to the camera body can be improved.

Moreover, there is such an advantage that the female screw of the inside fitting member can be easily bonded to the male screw of the inside lens holding frame.

It is apparent that, in this invention, a wide range of different working modes can be formed based on the invention without deviating from the spirit and scope of the invention. This invention is not restricted by its specific working modes except being limited by the appended claims.

What is claimed is:

1. A lens barrel comprising:
   a barrel body;
   inside and outside fitting members disposed within said barrel body at a predetermined interval in a direction along an axis of said barrel body and each formed with a female screw;

an inside lens holding frame having a male screw screwed into said female screw of said inside fitting member;

an outside lens holding frame having a male screw screwed into said female screw of said outside fitting member, an external diameter of said male screw of said inside lens holding frame being larger than an internal diameter of said female screw of said outside fitting member, said male screw of said inside lens holding frame being segmented into a plurality of portions by a plurality of notches having an internal diameter smaller than the internal diameter of said female screw; and a plurality of recesses formed in said outside fitting member and admitting passages of the plurality of segmented male screw portions of said inside lens holding frame.

2. The lens barrel according to claim 1, wherein said outside fitting member is disposed in a position closer to a camera body than said inside fitting member.

3. The lens barrel according to claim 1, wherein said female screw of said inside fitting member and said male screw of said inside lens holding frame are bonded together with a bonding agent supplied from a bonding tool inserted along said recess.

* * * * *